(12) United States Patent
Harris (10) Patent No.: US 6,964,125 B2
(45) Date of Patent: Nov. 15, 2005

(54) FLEXIBLE RUBBER CURB

(76) Inventor: Terry C. Harris, 574 E. Damascus Church Rd., Ranger, GA (US) 30734

(*) Notice: Subject to any disclaimer, the term of this patent is extended or adjusted under 35 U.S.C. 154(b) by 0 days.

(21) Appl. No.: 10/405,172

(22) Filed: Apr. 2, 2003

(65) Prior Publication Data

US 2003/0163955 A1    Sep. 4, 2003

Related U.S. Application Data

(63) Continuation-in-part of application No. 09/686,580, filed on Oct. 11, 2000, now abandoned.

(60) Provisional application No. 60/162,788, filed on Nov. 1, 1999.

(51) Int. Cl.$^7$ .............................................. A01G 1/00
(52) U.S. Cl. ...................................................... 47/33
(58) Field of Search ......................... 47/33; 404/6, 14, 404/15

(56) References Cited

U.S. PATENT DOCUMENTS

| | | | | |
|---|---|---|---|---|
| 2,927,513 A | * | 3/1960 | Dove ........................ | 256/13.1 |
| 4,105,353 A | * | 8/1978 | Bork et al. ..................... | 404/2 |
| 4,594,021 A | * | 6/1986 | Schafer et al. ................ | 404/14 |
| 5,286,136 A | * | 2/1994 | Mandish et al. ............... | 404/6 |
| 5,360,286 A | * | 11/1994 | Russell .......................... | 404/6 |
| 5,771,631 A | * | 6/1998 | Dawson ......................... | 47/33 |
| 6,012,254 A | * | 1/2000 | Gaston ......................... | 52/102 |

* cited by examiner

Primary Examiner—Francis T. Palo (57) ABSTRACT

A flexible curb apparatus includes a quantity of flexible polymeric material which includes a length, a width, and a height. The length is substantially greater than the width and the height. Also, a method of dividing a first ground surface from a second ground surface is comprised of the step of placing a flexible curb between the first ground surface and the second ground surface. A curved boundary can be present between the first ground surface and the second ground surface. To fabricate the flexible curb, a molding apparatus is employed. Internal drainage tubes are contained within the quantity of flexible polymeric material, and fasteners are provided for securing the tube-containing flexible curb to a ground surface. A coupler member can be connected between two separate flexible rubber curbs, and coupler fasteners are provided for connecting the coupler member to the two separate flexible rubber curbs.

1 Claim, 6 Drawing Sheets

FLEXIBLE RUBBER CURB

CROSS-REFERENCE TO RELATED APPLICATION

This application is a continuation-in-part of my prior copending patent application Ser. No. 09/686,580, filed Oct. 11, 2000; now abandoned, which, in turn, claims priority based upon my prior Provisional Application Ser. No. 60/162,788, filed Nov. 1, 1999.

BACKGROUND OF THE INVENTION

1. Field of the Invention

The present invention relates generally to edging articles and, more particularly, to articles especially adapted for providing a divider between two ground surfaces.

2. Description of the Prior Art

Providing a divider between two ground surfaces is well known in the art. Such dividers are especially useful in landscaping projects. In to such dividers, throughout the years, a number of innovations have been developed, and the following U.S. patents are representative of some of those innovations: U.S. Pat. Nos. 4,349,596, 4,647,491, 5,100,109, 5,265,374, and 5,377,447. More specifically, each of U.S. Pat. Nos. 4,349,596, 5,100,109, and 5,377,447 discloses a divider which has a hollow cross-section. Such a divider, having a hollow cross-section, may lack the strength and weight that would be desirable. In this respect, it would be desirable if a ground area divider were provided which does not include a hollow cross-section.

U.S. Pat. No. 4,647,491 discloses a divider that employs multiple layers. For purposes of simplicity and ease of manufacture, it would be desirable if a ground area divider were provided that does not include multiple layers.

U.S. Pat. No. 5,265,374 discloses a ground area divider which includes a plurality of straight and apparently rigid divider members connected together with straight and right angled joint members. Such a ground area divider, having essentially straight members, is very difficult to use with ground areas that have curved borders. Moreover, to use such a plurality of straight divider members, an assembly process is required to assemble the straight members with the joint members. For purposes of saving labor and time, and for being useful with curved ground boundaries, it would be desirable if a ground area divider were provided which does not include a plurality of rigid straight divider elements that are connected together with joint members.

Still other features would be desirable in a ground area divider. The accumulation of used automotive vehicle tires is a growing environmental problem. Rather than burning or decomposing such tires, it would be desirable if increased ways are developed for recycling such tires. In this respect, it would be desirable if a way were provided for using material from discarded automotive tires in a ground area divider.

To secure a ground area divider to the ground, it would be desirable if a ground area divider were provided with fasteners for fastening the ground area divider to the ground.

To prevent unwanted build-up of water around the ground area divider, it would be desirable if the ground area divider were provided with an internal drainage tube.

Individual ground area divider may be relatively short, and a number of such relatively short ground area dividers may be needed to be combined for divide a relatively large ground area. In this respect, it would be desirable if couplers were provided for coupling a plurality of ground area dividers together.

Prior art boundaries between ground surfaces are typically made from wooden timber, cross ties, concrete, or molded plastic. The wooden timbers have sharp corners, are ridged, and are pressure treated. Most pressure treatment includes arsenic, which presents a health hazard, especially if a ground surface boundary is used where children play. Cross ties have sharp corners and are treated with creosote. Creosote has been determined to be hazardous in playground applications. Concrete curbs do not include hazardous chemicals, but concreted curbs are hard and require specialty equipment for installation. Plastic curbs are generally hard and do not have any special safety characteristics, and they become brittle with age. In view of the above, it would be desirable if a ground area divider were provided which does not include hazardous chemicals, does not have sharp corners, and does not have a hard body that does not attenuate shocks experienced by a child who falls upon the ground area divider.

More specifically, with respect to attenuation of shocks experienced by a child who falls upon the ground area divider, the following standard is published by the American Society of Testing Materials (ASTM): ASTM F-1292-99 "Standard Specification for Impact Attenuation of Surface Systems Under and Around Playground Equipment". In this respect, it would be desirable if a ground area divider were provided that complies with the specifications set forth in ASTM F-1292-99 "Standard Specification for Impact Attenuation of Surface Systems Under and Around Playground Equipment".

Thus, while the foregoing body of prior art indicates it to be well known to use ground area dividers, the prior art described above does not teach or suggest a ground area divider which has the following combination of desirable features: (1) does not include a hollow cross-section; (2) does not include multiple layers; (3) does not include a plurality of rigid straight divider elements that are connected together with joint members; (4) employs material from discarded automotive tires in a ground area divider; (5) is provided with a horizontal internal drainage tube; (6) is provided with vertical drainage channels; (7) is provided with couplers for coupling a plurality of ground area dividers together; (8) does not include hazardous chemicals, does not have sharp corners, and does not have a hard body that does not attenuate shocks experienced by a child who falls upon the ground area divider; and (9) complies with the specifications set forth in ASTM F-1292-99 "Standard Specification for Impact Attenuation of Surface Systems Under and Around Playground Equipment". The foregoing desired characteristics are provided by the unique flexible rubber curb of the present invention as will be made apparent from the following description thereof. Other advantages of the present invention over the prior art also will be rendered evident.

SUMMARY OF THE INVENTION

To achieve the foregoing and other advantages, the present invention, briefly described, provides a flexible curb apparatus which includes a quantity of flexible polymeric material which includes a length, a width, and a height. The length is substantially greater than the width and the height, and the width and the height define a nonhollow cross-section. The flexible polymeric material is fabricated by the following steps: obtaining a quantity of base material of recycled rubber particles; obtaining a quantity of binder material; blending the base material with the binder material to form a base material/binder material blend; placing the base material/binder material blend in a mold apparatus; applying pressure to the base material/binder material blend in the mold apparatus to form the flexible polymeric material; and removing the flexible polymeric material from the mold apparatus. The recycled rubber particles have a particle size in a range of from −6 mesh to +16 mesh.

The flexible curb can be used to divide portions of ground surfaces. More specifically, a method of dividing a first ground surface from a second ground surface is comprised of the step of placing a flexible curb between the first ground surface and the second ground surface. Even more specifically, a method is provided for dividing a first ground surface from second ground surface wherein a curved boundary is present between the first ground surface and the second ground surface. In the method, the flexible curb is placed on the curved boundary.

To fabricate the flexible curb, a molding apparatus is employed. The molding apparatus includes a support assembly which includes a plurality of first side feet, a plurality of second side feet, and a mold reception assembly interconnected between the first side feet and the second side feet. A base mold holder is supported by the mold reception assembly. A mold member is supported by the base mold holder. A pressure source is provided, and a plurality of cylinder/piston assemblies are connected to the pressure source. A mold ram is connected to the cylinder/piston assemblies. The mold ram fits into the mold member.

In accordance with another embodiment of the invention, a flexible curb includes a quantity of flexible polymeric material which includes a length, a width, and a height, and the length is substantially greater than the width and the height. A horizontal internal drainage tube is contained within the quantity of flexible polymeric material, and fasteners are provided for securing the quantity of flexible polymeric material and the horizontal internal drainage tube to a ground surface.

The horizontal internal drainage tube includes external threads, and an interior portion of the quantity of flexible polymeric material, which receives the horizontal internal drainage tube, includes internal threads.

In addition, a plurality of vertical drainage channels are connected to and are in fluid communication with the horizontal internal drainage tube.

A coupler member can be connected between two separate flexible rubber curbs, and coupler fasteners are provided for connecting the coupler member to the two separate flexible rubber curbs.

Embodiments of the flexible curb comply with ASTM F-1292-99 "Standard Specification for Impact Attenuation of Surface Systems Under and Around Playground Equipment".

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved flexible rubber curb which has all of the advantages of the prior art and none of the disadvantages.

It is another object of the present invention to provide a new and improved flexible rubber curb which may be easily and efficiently manufactured and marketed.

It is a further object of the present invention to provide a new and improved flexible rubber curb which is of durable and reliable construction.

An even further object of the present invention is to provide a new and improved flexible rubber curb which is susceptible of a low cost of manufacture with regard to both materials and labor, and which accordingly is then susceptible of low prices of sale to the consuming public, thereby making such flexible rubber curb available to the buying public.

Still yet a further object of the present invention is to provide a new and improved flexible rubber curb which does not include a hollow cross-section.

Still another object of the present invention is to provide a new and improved flexible rubber curb that does not include multiple layers.

Yet another object of the present invention is to provide a new and improved flexible rubber curb which does not include a plurality of rigid straight divider elements that are connected together with joint members.

Even another object of the present invention is to provide a new and improved flexible rubber curb that employs material from discarded automotive tires in a ground area divider.

Another object of the present invention is to provide a new and improved flexible rubber curb having fasteners for fastening the flexible rubber curb to the ground.

Still another object of the present invention is to provide a new and improved flexible rubber curb having an internal drainage tube.

Yet another object of the present invention is to provide couplers for coupling a plurality of new and improved flexible rubber curbs together.

Still another object of the present invention is to provide a new and improved flexible rubber curb which does not include hazardous chemicals, does not have sharp corners, and does not have a hard body that does not attenuate shocks experienced by a child who falls upon the ground area divider.

Yet another object of the present invention is to provide a new and improved flexible rubber curb which complies with the specifications set forth in ASTM F-1292-99 "Standard Specification for Impact Attenuation of Surface Systems Under and Around Playground Equipment".

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved flexible rubber curb embodying the principles and concepts of the present invention will be described.

Figure 1:
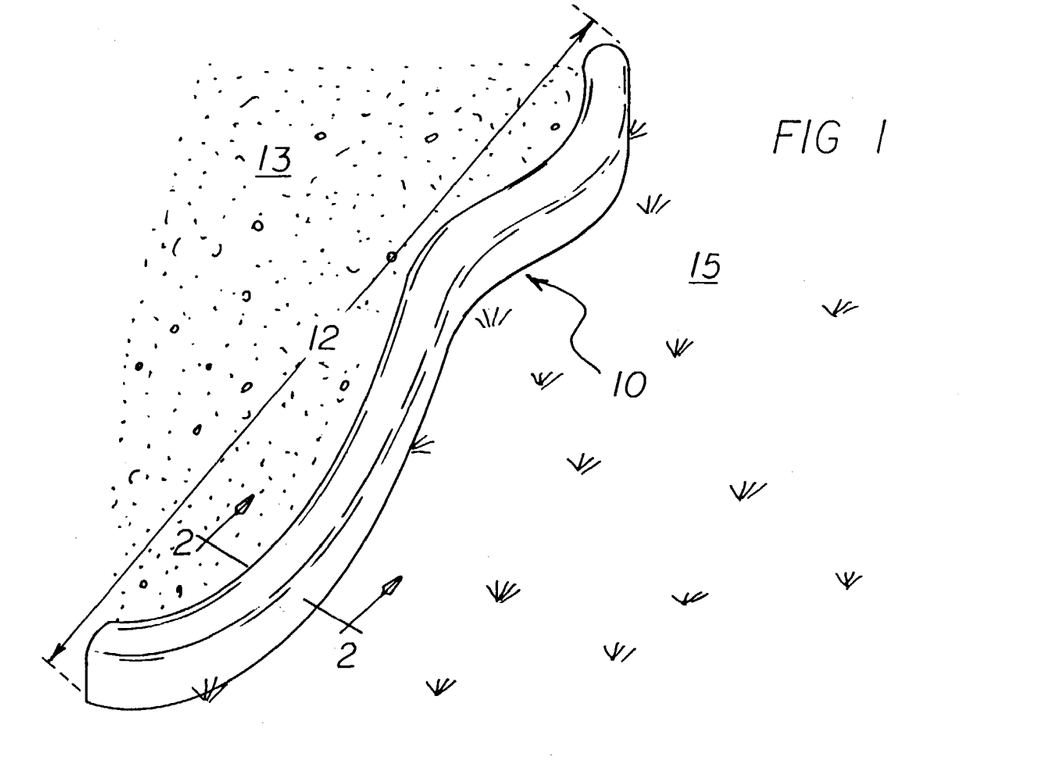
FIG. 1 is a perspective view showing a first embodiment of the flexible rubber curb of the invention in use as a separation barrier between a garden area and a lawn area.
Figure 2:
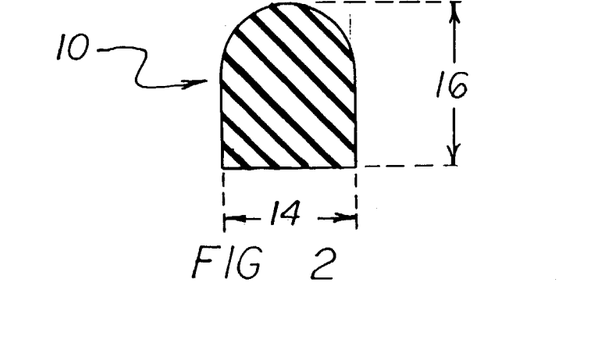
FIG. 2 is an enlarged cross-sectional view of the embodiment of the flexible rubber curb shown in FIG. 1 taken along line 2—2 of FIG. 1.

Turning to FIGS. 1–2, there is shown a first embodiment of the flexible rubber curb of the invention generally designated by reference numeral 10. In the embodiment of the invention shown, a flexible rubber curb 10 includes a quantity of flexible polymeric material which includes a length 12, a width 14, and a height 16. The length 12 is substantially greater than the width 14 and the height 16. The width 14 and the height 16 define a nonhollow cross-section. As shown substantially in FIG. 2, in transverse cross-section, the flexible rubber curb has a flat bottom surface, parallel flat sidewalls, and a rounded or convexly shaped top or crown.

The flexible polymeric material is fabricated by the following steps: obtaining a quantity of base material of recycled rubber particles; obtaining a quantity of binder material; blending the base material with the binder material to form a base material/binder material blend; placing the base material/binder material blend in a mold apparatus; applying pressure to the base material/binder material blend in the mold apparatus to form the flexible polymeric material; and removing the flexible polymeric material from the mold apparatus. The recycled rubber particles have a particle size in a range of from −6 mesh to +16 mesh.

The flexible curb 10 can be used to divide portions of ground surfaces. More specifically, a method of dividing a first ground surface 13 from a second ground surface 15 is comprised of the step of placing a flexible curb 10 between the first ground surface 13 and the second ground surface 15. Even more specifically, a method is provided for dividing a first ground surface 13 from second ground surface 15 wherein a curved boundary is present between the first ground surface 13 and the second ground surface 15. In the method, the flexible curb 10 is placed on the curved boundary.

Figure 3:
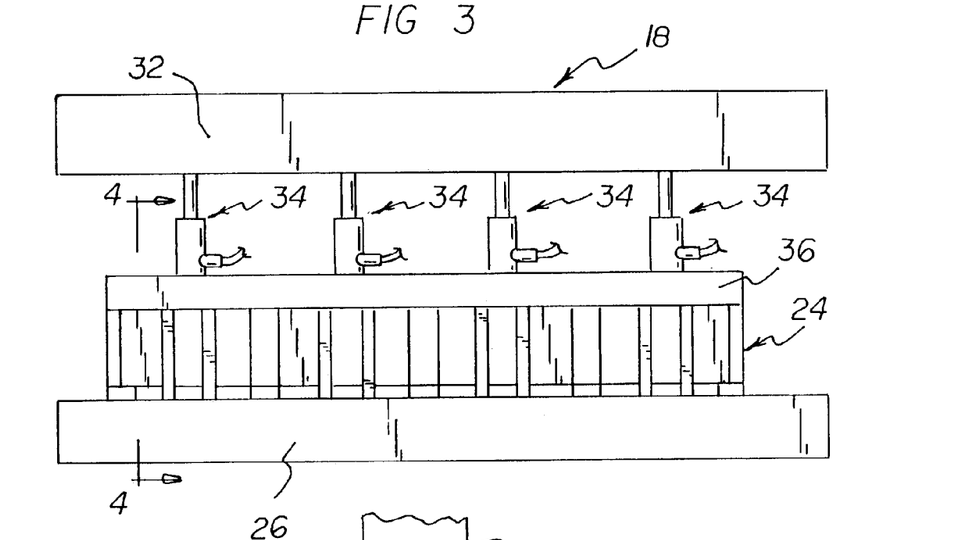
FIG. 3 is a side view of a molding apparatus employed for fabricating the flexible rubber curb.
Figure 4:
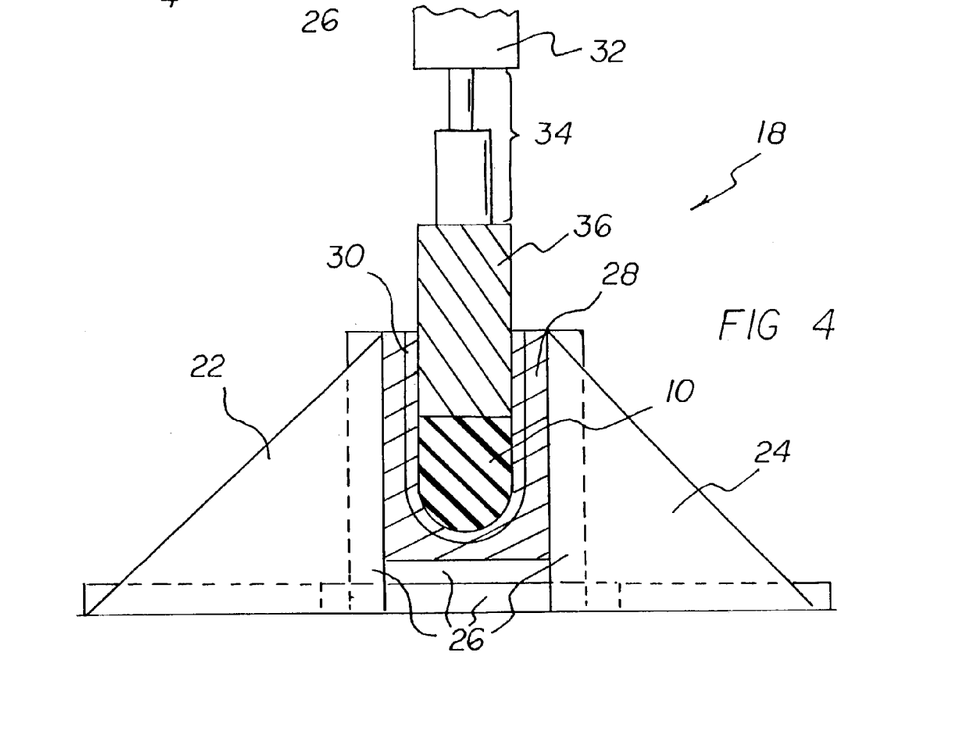
FIG. 4 is an enlarged cross-sectional view of the molding apparatus shown in FIG. 3 taken along line 4—4 thereof.

To fabricate the flexible curb 10, a molding apparatus 18 is employed. The molding apparatus 18 includes a support assembly which includes a plurality of first side feet 22, a plurality of second side feet 24, and a mold reception assembly 26 interconnected between the first side feet 22 and the second side feet 24. A base mold holder 28 is supported by the mold reception assembly 26. A mold member 30 is supported by the base mold holder 28. A pressure source 32 is provided, and a plurality of cylinder/piston assemblies 34 are connected to the pressure source 32. A mold ram 36 is connected to the cylinder/piston assemblies 34. The mold ram 36 fits into the mold member 30.

Figure 5:
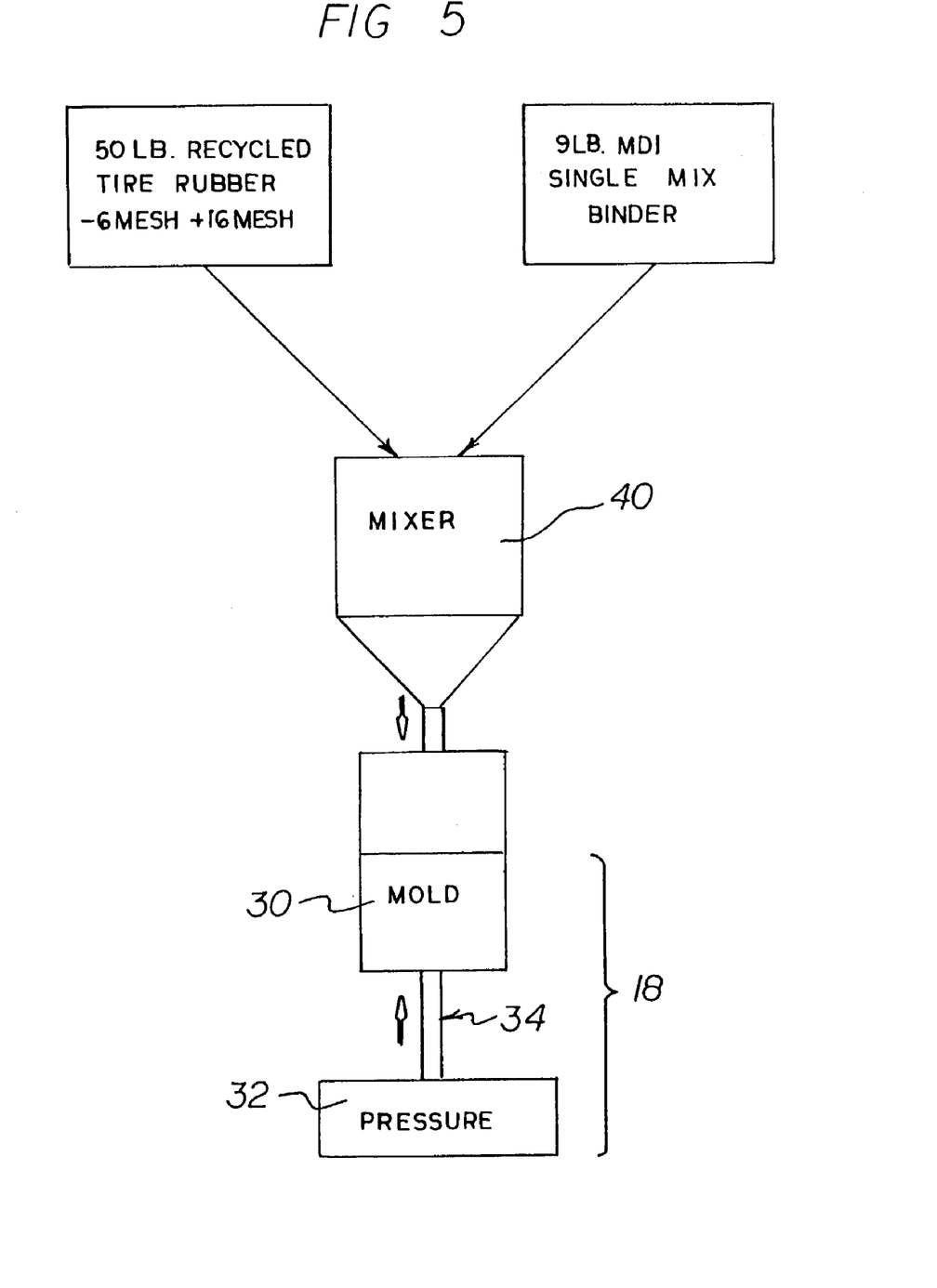
FIG. 5 is a flow chart depicting a process for fabricating the flexible rubber curb of the invention.

A process for fabrication of a flexible curb 10 of the invention is shown diagrammatically in the flowchart in FIG. 5. More specifically, 50 lbs of base material, which is recycled tire rubber having a particle size in a range of −6 mesh to +16 mesh, is added to a mixer 40. Also, 9 lb. of a suitable binder material, which preferably is MDI single binder mix modified to set within 60 minutes of placement, is added to the mixer 40. The recycled rubber particles and the binder are mixed in the mixer 40 so that the rubber particles are thoroughly wetted by the binder. In the mixer, the rubber particles and the binder form a base material/binder material blend. Then, the base material/binder material blend is placed in the molding apparatus 18.

More specifically, the base material/binder material blend is placed in the mold member 30. As shown in FIG. 4, mold member 30 has a shape suitable to form the cross-section shown in FIG. 2. Then, pressure is developed in the pressure source 32, and pressure is transmitted through the cylinder/piston assemblies 34 to the mold ram 36, which enters the mold member 30 and applies molding pressure to the base material/binder material blend in the mold member 30 to form a molded flexible curb 10. Then, the mold ram 36 is retracted, and the flexible curb 10 is removed from the molding apparatus 18. Also, any undesirable flashing on the flexible curb 10 can be removed.

As shown in FIG. 1, the flexible curb 10 is used to separate a first ground surface 13, such as a playground area, from a second ground surface 15, such as a lawn area. The curved boundary between the first ground surface 13 and the second ground surface 15 is conformed to by the flexible curb 10. Generally, the flexible curb 10 of the invention can be used for landscaping borders in a wide variety of applications which further include garden borders.

When the flexible curb 10 is used as a playground border, the flexible curb 10 can have a width 14 of 6 inches and a height 16 of 6 inches. On the other hand, when the flexible curb 10 is used as a landscaping border, the flexible curb 10 can have a width 14 of 4 inches and a height 16 of 4 inches. Clearly modifications in width 14 and height 16 can be made to suit the flexible curb 10 to the application desired. Because of the rounded top surface or crown of the flexible curb 10, injuries to persons falling on and impacting the curb are substantially mitigated. The safety of the flexible curb 10, especially when used in playgrounds, further is enhanced by its natural flexure and "give" when impacted by another object.

Figure 6:
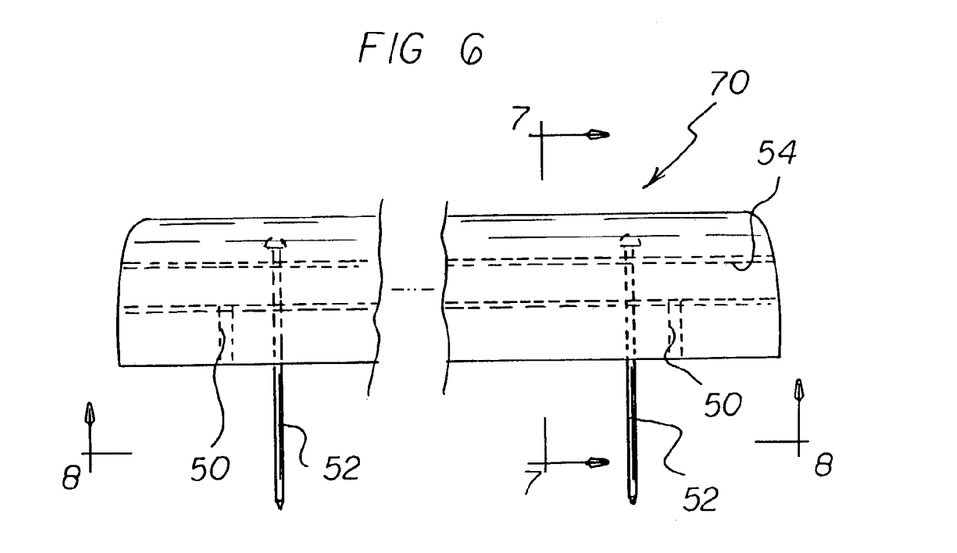
FIG. 6 is side view of a second embodiment of the flexible rubber curb of the invention which includes fasteners, a horizontal internal drainage tube, and vertical drainage channels.
Figure 7:
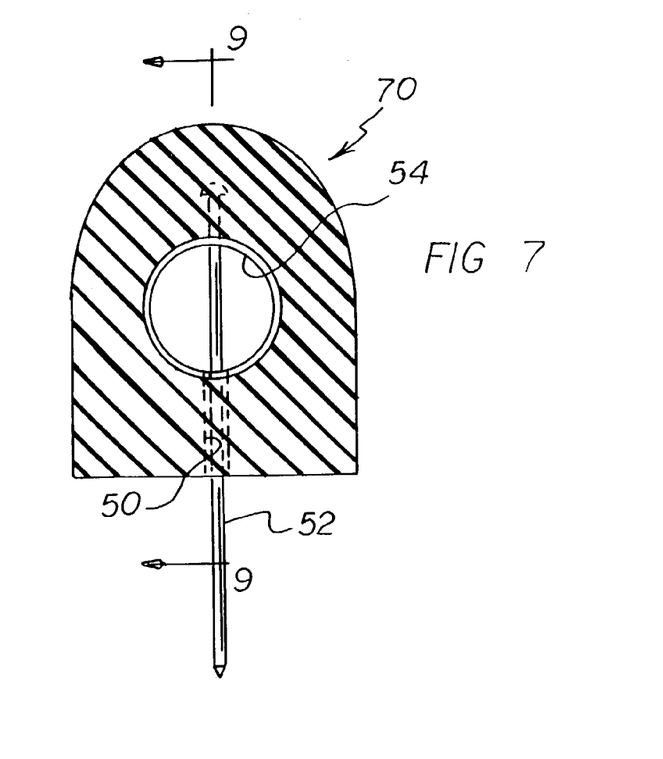
FIG. 7 is an enlarged cross-sectional view of the embodiment of the invention shown in FIG. 6 taken along line 7—7 thereof.

In accordance with another embodiment of the invention, a flexible curb 70 includes a quantity of flexible polymeric material which includes a length 12, a width 14, and a height 16, and the length 12 is substantially greater than the width 14 and the height 16. A horizontal internal drainage tube 54 is contained within the quantity of flexible polymeric material, and fasteners 52 are provided for securing the quantity of flexible polymeric material and the horizontal internal drainage tube 54 to a ground surface. But for the tube 54, the embodiment 70 has substantially the same transverse cross-sectional shape of curb 10, FIG. 2.

The horizontal internal drainage tube 54 includes external spiral threads or ridges 62, and an interior portion of the quantity of flexible polymeric material, which receives the horizontal internal drainage tube 54, includes complementary internal threads or ridges 60. The drainage tube 54 may be of the well known flexible PVC corrugated tubing, or the like, commonly commercially available, and preferably has a series of slits or openings in its surface to facilitate drainage.

Figure 8:
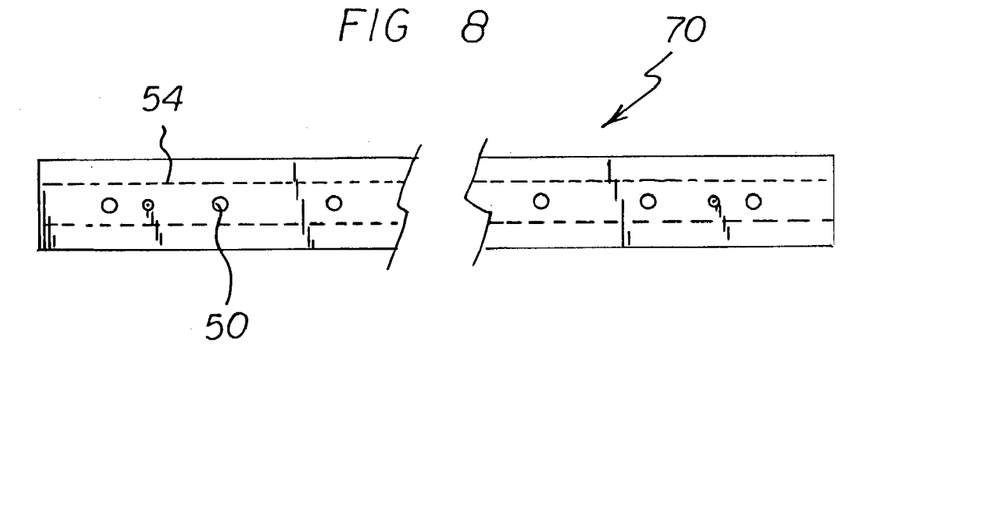
FIG. 8 is a bottom view of the embodiment shown in FIG. 6 taken along line 8—8 thereof.
Figure 9:
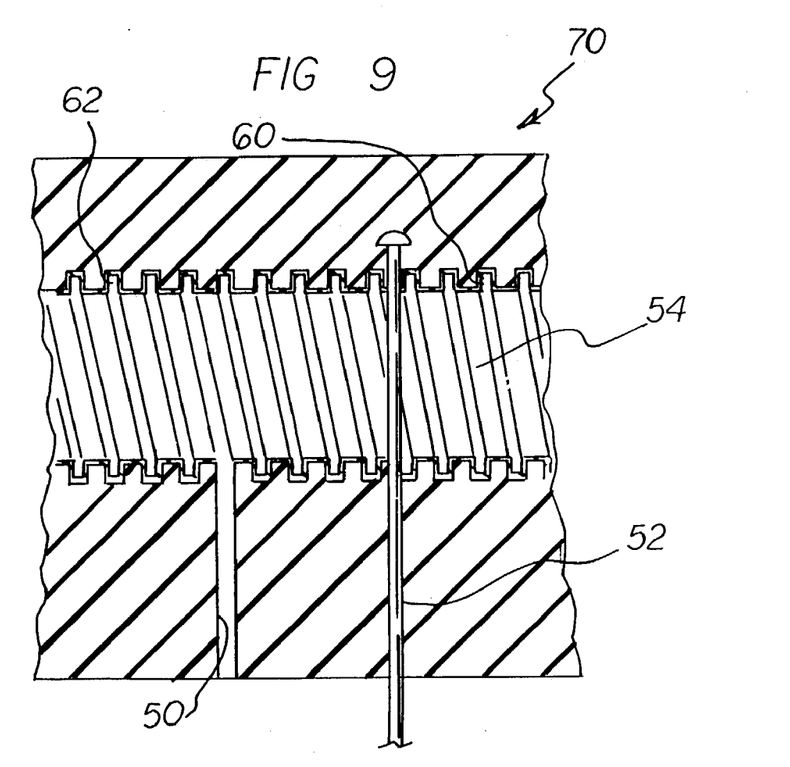
FIG. 9 is an enlarged cross-sectional view of the embodiment shown in FIG. 7 taken along line 9—9 thereof.

In addition, a plurality of vertical drainage channels 50 are connected to and are in fluid communication with the horizontal internal drainage tube 54.

When water enters one portion of the horizontal internal drainage tube 54, the water flows along the internal surface of the tube and exits from the other slits in the tube and/or from the vertical drainage channels 50.

Figure 10:
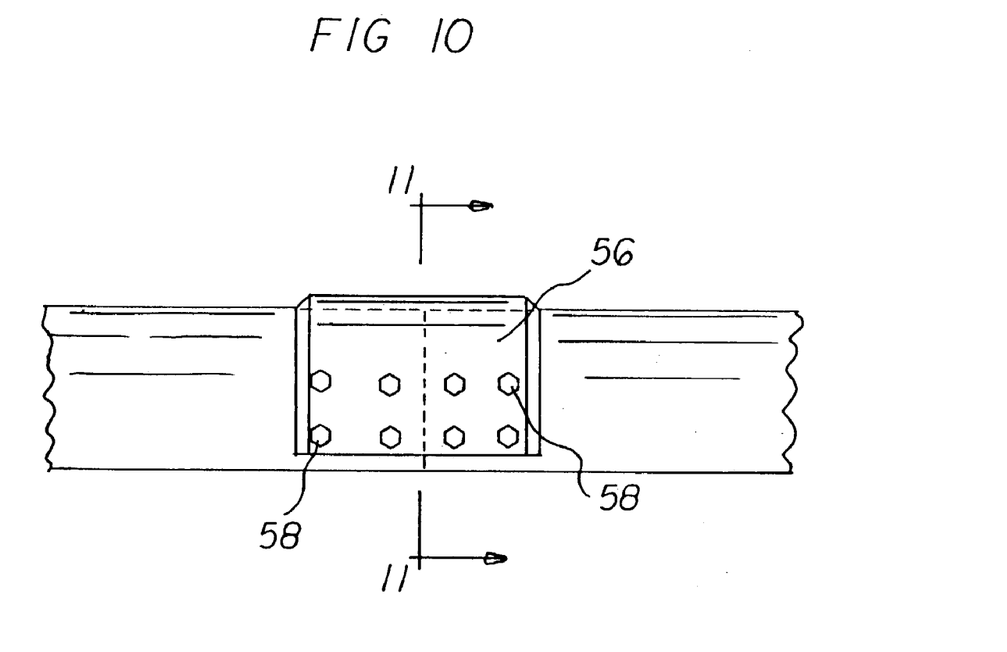
FIG. 10 is a side view of a coupler member used to couple two flexible rubber curbs together.
Figure 11:
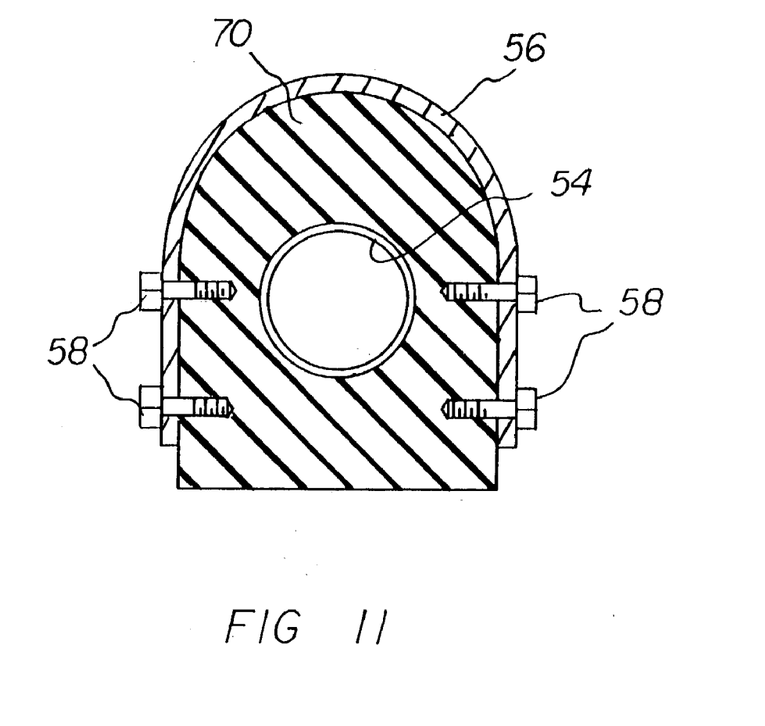
FIG. 11 is an enlarged cross-sectional view of the embodiment of the invention shown in FIG. 10 taken along line 11—11 thereof.

As shown in FIGS. 10 and 11, a coupler member 56 can be connected between two separate quantities of flexible polymeric material, and coupler fasteners 58 are provided for connecting the coupler member 56 to the two separate quantities of flexible polymeric material.

More specifically, to install the coupler member 56 on the two separate quantities of flexible polymeric material, two separate flexible rubber curbs of the invention are placed end to end. The coupler member 56 is installed on the two ends of the two separate flexible rubber curbs, so as to straddle both of the two ends of the flexible rubber curbs. The coupler fasteners 58, such as bolts 58, are screwed into the respective flexible rubber curbs through bolt-reception channels in the coupler member 56.

For esthetic purposes, as shown in FIGS. 10 and 11, if the two flexible rubber curbs have convex top surfaces, the coupler member 56 can be generally U-shaped, having a concave inside surface to fit onto the convex top surfaces of the flexible rubber curbs.

In fabricating the alternatively preferred embodiment of FIGS. 6–11, a suitable length of flexible tubing 54, which preferably is corrugated, first is placed in the mold member 30. Then, the blend is placed in the mold member 30 in surrounding relation to the tube. Next, pressure is developed in the pressure source 32, and pressure is transmitted through the cylinder/piston assemblies 34 to the mold ram 36, which enters the mold member 30 and applies molding pressure to the base material/binder material blend in the mold member 30 surrounding the tube 54 to form the molded flexible curb 70. Then, the mold ram 36 is retracted, the flexible curb 10 is removed from the molding apparatus 18 and the drainage holes 50 formed in the bottom flat surface of the molded article using a conventional cutting or hole forming tool or punch. The tool penetrates the molded curb material and the tube 54 therein. Finally, any undesirable flashing on the flexible curb 10 is removed.

Samples of the flexible rubber curb of the invention have been submitted for testing to a commercial testing company, and they have complied with the specifications of ASTM F-1292-99 "Standard Specification for Impact Attenuation of Surface Systems Under and Around Playground Equipment," which standard hereby is incorporated herein by this reference.

Furthermore, the flexible curb can be made from a wide variety of flexible rubber or elastomer compositions. Any suitable rubber or elastomer composition can be used for carrying out the method of the invention of separating a first ground surface 13 from a second ground surface 15 which has a curved boundary therebetween.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved flexible rubber curb that is low in cost, relatively simple in design and operation, and which may advantageously be used to without having a hollow cross-section. With the invention, a flexible rubber curb is provided which does not include multiple layers. With the invention, a flexible rubber curb is provided which does not include a plurality of rigid straight divider elements that are connected together with joint members. With the invention, a flexible rubber curb is provided which employs material from discarded automotive tires in a ground area divider. With the invention, a flexible rubber curb is provided with fasteners for fastening the flexible rubber curb to the ground. With the invention, a flexible rubber curb is provided with a horizontal internal drainage tube. With the invention, a flexible rubber curb is provided with vertical drainage channels connected to the horizontal internal drainage tube. With the invention, a flexible rubber curb is provided along with couplers for coupling a plurality of flexible rubber curbs together. With the invention, a flexible rubber curb is provided that does not include hazardous chemicals, does not have sharp corners, and does not have a hard body that does not attenuate shocks experienced by a child who falls upon the ground area divider. With the invention, a flexible rubber curb is provided which complies with the specifications set forth in ASTM F-1292-99 "Standard Specification for Impact Attenuation of Surface Systems Under and Around Playground Equipment".

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed is:

1. A flexible curb, comprising:
   a quantity of flexible polymeric material which includes a length, a width, and a height, and wherein said length is substantially greater than said width and said height,
   a horizontal internal drainage tube contained within said quantity of flexible polymeric material, and
   fasteners for securing said quantity of flexible polymeric material and said horizontal internal drainage tube to a ground surface,
   further including:
   a plurality of vertical drainage channels connected to and in fluid communication with said horizontal internal drainage tube, said vertical drainage channels being offset with respect to said fasteners.

* * * * *